(12) United States Patent  
Kim

(10) Patent No.: US 8,408,462 B2  
(45) Date of Patent: *Apr. 2, 2013

(54) TIME-VARYING BARCODE IN AN ACTIVE DISPLAY

(76) Inventor: Moon J. Kim, Wappingers Falls, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/556,831

(22) Filed: Jul. 24, 2012

(65) Prior Publication Data

US 2012/0292392 A1 Nov. 22, 2012

Related U.S. Application Data

(63) Continuation of application No. 13/106,514, filed on May 12, 2011, now Pat. No. 8,256,673.

(51) Int. Cl.
*G06K 5/00* (2006.01)

(52) U.S. Cl. .............. 235/437; 235/375; 235/462.07; 235/462.11; 235/462.45

(58) Field of Classification Search ............ 235/437, 235/375, 462.07, 462.11, 462.42
See application file for complete search history.

(56) References Cited

U.S. PATENT DOCUMENTS

| | | | |
|---|---|---|---|
| 5,073,954 A | 12/1991 | Van Tyne et al. | |
| 5,278,397 A | 1/1994 | Barkan et al. | |
| 5,591,952 A | 1/1997 | Krichever et al. | |
| 7,273,180 B2 | 9/2007 | Zhu et al. | |
| 7,360,706 B2 | 4/2008 | Zhu et al. | |
| 7,946,493 B2 * | 5/2011 | Havens et al. | 235/462.42 |
| 2005/0005102 A1 * | 1/2005 | Meggitt et al. | 713/164 |
| 2006/0054695 A1 | 3/2006 | Owada | |
| 2007/0187509 A1 | 8/2007 | Kotlarsky et al. | |
| 2007/0199993 A1 | 8/2007 | Kotlarsky et al. | |
| 2007/0242883 A1 * | 10/2007 | Kruppa | 382/181 |
| 2008/0277475 A1 | 11/2008 | Kotlarsky et al. | |
| 2009/0308927 A1 * | 12/2009 | Longacre et al. | 235/462.1 |
| 2010/0020970 A1 | 1/2010 | Liu et al. | |
| 2010/0125497 A1 * | 5/2010 | Arguello | 705/14.33 |
| 2011/0000958 A1 | 1/2011 | Herzig | |

* cited by examiner

*Primary Examiner* — Allyson Trail

(74) *Attorney, Agent, or Firm* — Ronald A. D'Alessandro; Keohane & D'Alessandro PLLC

(57) ABSTRACT

Embodiments of the present invention provide time-varying barcodes in an active display for information exchange. Specifically, embodiments of the present invention provide a system and method for communicating information between electronic devices via a barcode image sequence. In a typical embodiment, a barcode image sequence is displayed on the display screen of a first electronic device. A second electronic device reads and decodes the barcode image sequence. The second electronic device displays an acknowledgement on the display screen of the second electronic device. The acknowledgement is read by the first electronic device.

20 Claims, 6 Drawing Sheets

TIME-VARYING BARCODE IN AN ACTIVE DISPLAY

FIELD OF THE INVENTION

In general, the present invention relates to barcodes. Specifically, the present invention relates to time-varying barcodes in an active display for information exchange.

BACKGROUND OF THE INVENTION

A barcode is a static, optical machine-readable representation (image) of data. The bars are read by variances in reflected light. Barcode readers are relatively inexpensive and more accurate than key entry. However, issues arise when the barcode image is low resolution or has become obstructed or damaged in some way, causing a failed read or misread of the barcode information. Barcodes are also susceptible to limitations of the printer and reader. For example, barcodes printed on dark backgrounds like corrugated cardboard may be difficult to read. Heretofore, several unsuccessful attempts have been made to address these shortcomings.

U.S. Patent Application 20110000958 discloses a method and system for communicating encoded information through "animated" barcodes wherein a single bar code area on an electronics' display or television is scanned multiple times while the bar code area changes from one bar code image to another.

U.S. Patent Application 20100020970 discloses a system and method for creating a camera imaging data channel by encoding a sequence of bar codes from a display screen and captured by a camera, then decoded by software on a cell phone or similar device.

U.S. Patent Application 20060054695 discloses a dynamic bar code display apparatus that includes a storage medium and means for displaying at least two or more bar codes continuously.

U.S. Pat. No. 7,360,706 and U.S. Pat. No. 7,273,180 disclose a hand-supportable digital imaged-based bar code symbol reading device.

U.S. Pat. No. 5,591,952 discloses a bar code reader that utilizes a CCD imager device to capture the image and the memory data from the imager device is analyzed to recognize and decode any symbols included within the image.

U.S. Pat. No. 5,278,397 discloses a multi-resolution bar code reader in which the bar code reader's optics and sensing elements are organized to send two channels of data derived from a bar code scan.

U.S. Pat. No. 5,073,954 discloses the bar code location and recognition processing system in which a bar code is optically scanned and a digital video processor converts the scan to binary data and determines the location and pattern of the bar code in the scan image.

U.S. Patent Application 20080277475 discloses a digital image capture and processing system that combines video and snapshot image captures into a single bar code data capture cycle.

U.S. Patent Application 20070199993 and U.S. Patent Application 20070187509 disclose a hand-supportable digital bar code reader that has multiple modes of image processing capabilities that include reading both 1D and 2D bar code symbols.

None of these references, however, teach the use of an error-identifying or two-way communication feed-back loop in a dual electronic device apparatus that uses image display and image capturing devices to communicate between the devices via bar codes in at least one direction. Furthermore, none of these references teach the use of bar codes that have varying sections of bar code image pattern resolution within a single bar code pattern.

SUMMARY OF THE INVENTION

In general, embodiments of the present invention provide time-varying barcodes in an active display for information exchange. Specifically, embodiments of the present invention provide a system and method for communicating information between electronic devices via a barcode image sequence. In a typical embodiment, a barcode image sequence is displayed on the display screen of a first electronic device. A second electronic device reads and decodes the barcode image sequence. The second electronic device displays an acknowledgement on the display screen of the second electronic device. The acknowledgement is read by the first electronic device.

A first aspect of the present invention provides a data communication system for communicating information between electronic devices via a barcode image sequence, said system comprising: a first electronic device, comprising: a display screen; a display component configured to display a barcode image sequence on the display screen of the first electronic device; a second electronic device, comprising: a display screen; a camera configured to read the barcode image sequence; a barcode decoding component configured to decode the barcode image sequence; and a display component configured to display an acknowledgement on the display screen of the second electronic device.

A second aspect of the present invention provides a method for communicating information between electronic devices via a barcode image sequence, comprising: displaying a barcode image sequence on the display screen of a first electronic device; reading and decoding the barcode image sequence by a second electronic device; and displaying an acknowledgement on the display screen of the second electronic device.

A third aspect of the present invention provides a method for providing a data communication system for communicating information between electronic devices via a barcode image sequence, said system comprising: providing a first electronic device, comprising: a display screen; a display component configured to display a barcode image sequence on the display screen of the first electronic device; providing a second electronic device, comprising: a display screen; a camera configured to read the barcode image sequence; a barcode decoding component configured to decode the barcode image sequence; and a display component configured to display an acknowledgement on the display screen of the second electronic device.

BRIEF DESCRIPTION OF THE DRAWINGS

These and other features of this invention will be more readily understood from the following detailed description of the various aspects of the invention taken in conjunction with the accompanying drawings in which.

Figure 1:
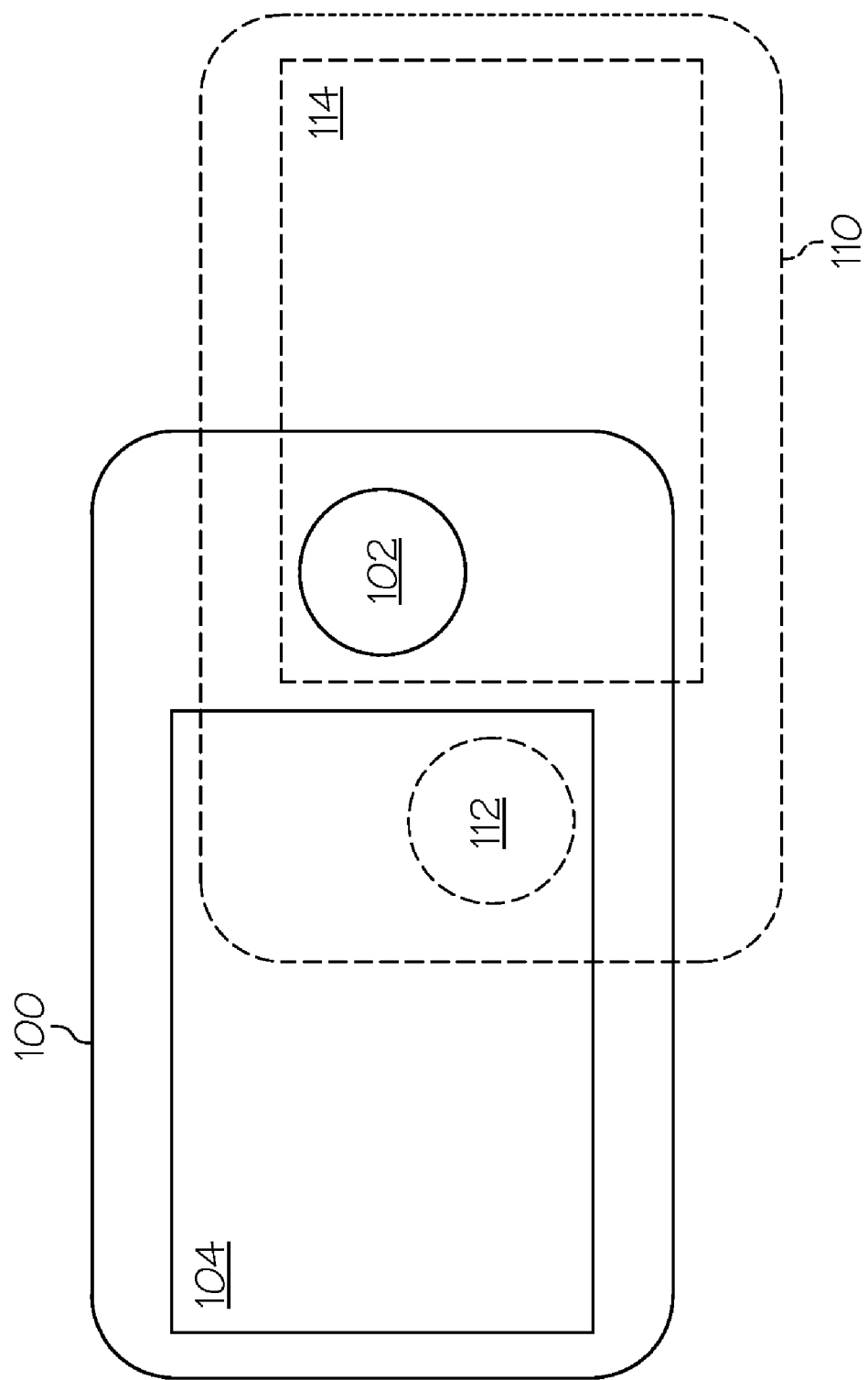
FIG. 1 depicts dual electronic devices having image display and image capturing components according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Hereinafter, a camera includes any electronic device or component configured to capture and provide signals and/or data representative of video images. Video images include, but are not limited to, barcode images.

The barcode can be traced back to 1948, but it did not have a large impact until the 1970's when it became a tool in alleviating manual inventories. Grocery store owners began to see it as a way to save time and money in tracking product levels within the store. Throughout the 1970's, barcode scanning systems became more affordable and practical with the continued price reduction and miniaturization of barcode readers.

However, the barcode reader usually needs a fairly good picture of the symbol to decode these barcodes. Barcodes can store a large amount of data, but grow in size and complexity relative to the amount of data stored. The bigger and more complex the barcode, the better the picture required to decode it.

As indicated above, embodiments of the present invention provide a system and method for communicating information between electronic devices via a barcode image sequence. In a typical embodiment, a barcode image sequence is displayed on the display screen of a first electronic device. A second electronic device reads and decodes the barcode image sequence. The second electronic device displays an acknowledgement on the display screen of the second electronic device. The acknowledgement is read by the first electronic device.

Referring now to FIG. 1, dual electronic devices having image display and image capturing components according to an embodiment of the present invention are depicted. Barcode terminal 1 (T1) 100 includes camera 1 (C1) 102 and display screen 1 (S1) 104. Barcode terminal 2 (T2) 110 includes camera 2 (C2) 112 and display screen 2 (S2) 114. T1 100 and T2 110 are facing each other. S1 104 covers C2 112 and S2 114 covers C1 102. T1 100 and T2 110 each use image display and image capturing capabilities which enable two-way communication. For simplicity, hereinafter, Barcode Terminal 1 100 is referred to as T1 and Barcode Terminal 2 110 is referred to as T2.

Figure 2B:
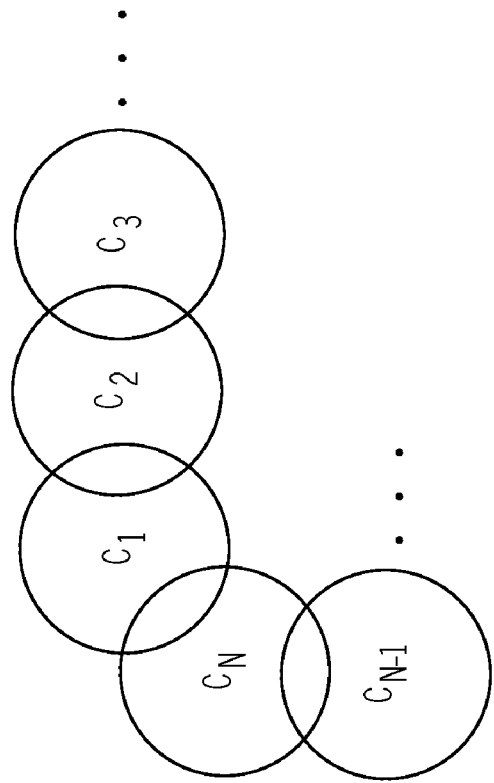
FIG. 2B depicts error correcting code information according to an embodiment of the present invention.
Figure 2A:
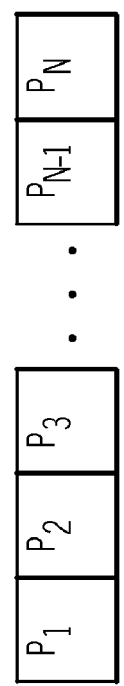
FIG. 2A depicts intended data divided into packets according to an embodiment of the present invention.

FIG. 2A depicts intended data divided into packets according to an embodiment of the present invention. The data to be communicated/transmitted is divided into packets. The size of each packet is dependent upon several factors including, but not limited to, display screen resolution, barcode image size, and data communication channel quality (i.e., the quality of the display screen and camera).

FIG. 2B depicts error correcting code information according to an embodiment of the present invention. Each packet has redundancy to the previous and next packet (when applicable). This means that each packet will include information from the previous and next packet (when applicable). If a packet is lost, then the missing information may be reconstructed at the receiver from the error correcting code data contained in the other packet(s), provided that the average number of consecutively lost packets is small.

Each data packet is coded as a barcode image with additional error-correcting code. For example, T1 displays an image on its display screen. The camera on T2 reads the image. Any errors that are introduced are detected and corrected based on the remaining codes. The display screen of T2 displays a check sum which is read by the camera of T1. T1 verifies the transmission results. If error increases, the image resolution may be decreased or the cameras need to be realigned.

Figure 3:
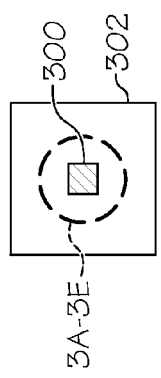
FIG. 3 depicts a camera resolution checkup sequence according to an embodiment of the present invention.
Figure 3A:
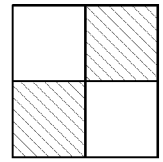
Figure 3B:
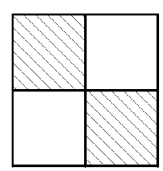
Figure 3C:
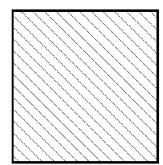
Figure 3D:
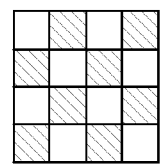
Figure 3D:
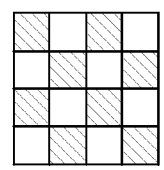
Figure 4C:
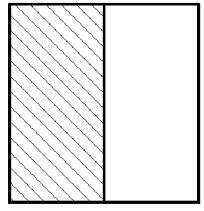
FIG. 4 depicts a camera detection location sequence according to an embodiment of the present invention.
Figure 4E:
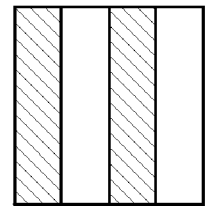
Figure 4B:
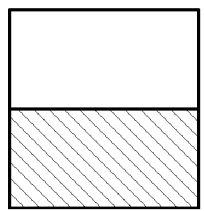
Figure 4D:
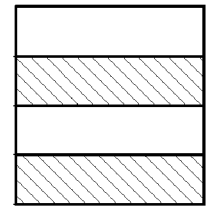
Figure 4A:
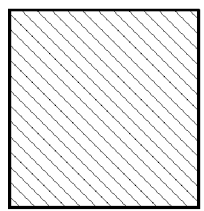

FIG. 3 depicts a camera resolution checkup sequence according to an embodiment of the present invention. The resolution calibration is used to determine the resolution capability of a camera. T1 displays a sequence of images on its display screen. T1 displays the images beginning from the simplest image to the most complex image in increasing complexity. The camera on T2 reads each image as they are displayed and responds through its display screen with a spatial and temporal code. T1 determines the resolution capability of the camera of T2 based on the codes read from the display screen of T2.

A similar camera resolution checkup sequence is also ran to determine the resolution capability of the camera on T1. T2 displays a sequence of images on its display screen. T2 displays the images beginning from the simplest image to the most complex image in increasing complexity. The camera on T1 reads each image as they are displayed and responds through its display screen with a spatial and temporal code. T2 determines the resolution capability of the camera on T1 based on the codes read from the display screen of T1.

FIG. 4 depicts a camera detection location sequence according to an embodiment of the present invention. Each barcode terminal must perform an alignment detection algorithm to determine the camera location of the other barcode terminal on its own screen. To accomplish this task, T1 displays an image or multiple images on its screen. The camera of T2 reads part of the display screen of T1 and generates a whole screen response on the display screen of T2. T1 reads the response from the display of T2 to determine the camera location of T2 on the screen of T1.

T2 repeats the process to determine the camera location of T1 on the screen of T2. T2 displays an image or multiple images on its screen. The camera of T1 reads part of the display screen of T2 and generates a whole screen response on the display screen of T1. T2 reads the response from the display of T1 to determine the camera location of T1 on the screen of T2.

Figure 5C:
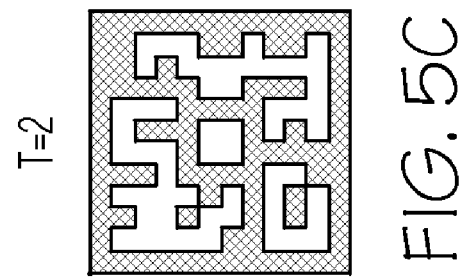
FIG. 5 depicts time-varying barcodes that are sequentially displayed according to an embodiment of the present invention.
Figure 5B:
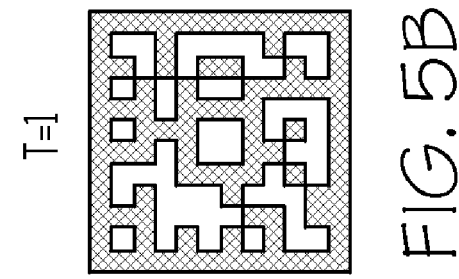
Figure 5A:
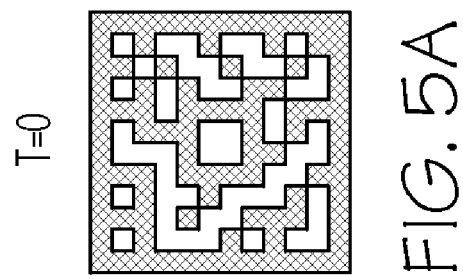

FIG. 5 depicts time-varying codes that are sequentially displayed according to an embodiment of the present invention. The images within the barcode sequence do not have to have the same specifications (e.g., resolution, size, etc.). Each image in the sequence may have its own set of characteristics. For example, information to be communicated may be divided into three packets. Since each packet has less data, the images generated from the packets will be less complex (and thus, easier to read) than an image generated from the whole message. An image generated from the whole message would be complex and require a higher resolution. Since each packet contains only part of the whole information, the images generated from each packet may be readable by a lower resolution reader. Also, image code display periods do not have to be constant. More time may be given to more complex codes and less time for simpler codes.

Figure 6:
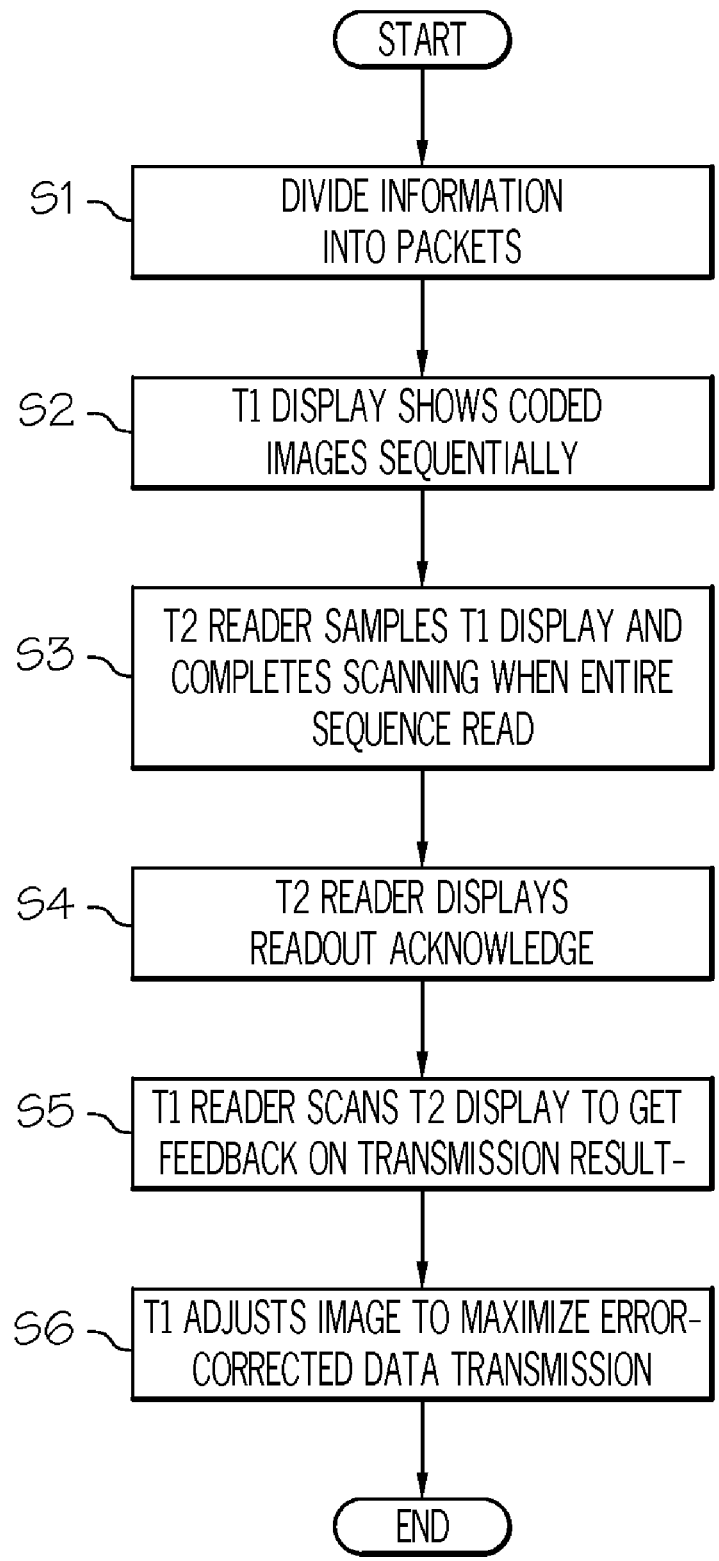
FIG. 6 depicts a process flow diagram according to an embodiment of the present invention.

FIG. 6 depicts a process flow diagram according to an embodiment of the present invention. Whole information is divided by a group of packets (step S1). Each packet has redundancy to previous and next packet. Each data packet is coded as an image with additional error-correcting code. The first barcode terminal (T1) display shows coded images sequentially (step S2). The second barcode terminal (T2) reader periodically samples display and completes scanning when whole sequence is read and decoded (step S3). T2 reader displays readout acknowledgement to reader screen (step S4). T1 reader scans T2 display to get feedback on transmission result (step S5). T1 adjusts image code characteristics (e.g., resolution, size, location) dynamically to maximize error-corrected data transmission (step S6).

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A data communication device for communicating information via an image, said device comprising:
    a display screen;
    a display component configured to display an image sequence or authentication graphic on the display screen;
    a camera configured to read the image sequence or an authentication graphic;
    a decoding component configured to decode the read image sequence; and
    a receiving component configured to receive the authentication graphic from the camera, wherein the device is configured to perform an alignment detection algorithm using the camera, the display, and the image sequence graphic or the authentication graphic.

2. The data communication device of claim 1, further comprising a second device, the second device comprising components to at least one of:
    display an image sequence on a display screen of the second device and recognize a return authentication graphic by a camera; and
    read an image sequence by a camera of the second device and display an authentication graphic on a display screen.

3. The data communication device of claim 2, wherein the second device further comprises:
    a display screen;
    a display component configured to display an image sequence or authentication graphic on the display screen of the second device;
    a camera configured to read an image sequence or an authentication graphic;
    a decoding component configured to decode the read image sequence; and
    a receiving component configured to receive the authentication graphic from the camera,
    wherein the second device is configured to perform an alignment detection algorithm to locate a camera viewing the screen of the second device.

4. The data communication device of claim 1, wherein the image sequence and authentication graphic each comprises at least one of: a barcode, a quick response (QR) code, and a graphical image.

5. The data communication device of claim 1, wherein the device further comprises an image generating component configured to generate the displayed image sequence from the information, wherein the information is divided into packets, each packet being encoded as an image, and each packet including redundancy information or error correction data.

6. The data communication device 1, wherein the device further comprises at least one of: a display resolution component configured to adjust image resolution based on a resolution calibration test, a display size component configured to adjust image size based on a size calibration test, and a display location component configured to adjust image location based on a location calibration test.

7. The data communication device of claim 1, wherein the display component is further configured to display the image sequence with varying time intervals between images.

8. A method for communicating information via an image, comprising:
    displaying an image sequence on a display screen of a first electronic device;
    reading an image sequence by a camera of a second electronic device;
    decoding the read image sequence by the second electronic device;
    displaying an authentication graphic on the display screen of the second electronic device, the authentication graphic being generated in response to the image sequence; and
    performing an alignment detection algorithm using the authentication graphic as processed by the first electronic device.

9. The method of claim 8, further comprising:
    displaying an image sequence on a display screen of a second electronic device; and
    receiving and reading an authentication graphic by a camera of the second electronic device.

10. The method of claim 8, wherein the image sequence and authentication graphic each comprises at least one of: a barcode, a quick response (QR) code, and a graphical image.

11. The method of claim 8, further comprising the displayed image sequence from the information, wherein the information is divided into packets, each packet being encoded as an image, and each packet including redundancy information or error correction data.

12. The method of claim 8, wherein displaying the image sequence comprises at least one of: adjusting image resolution based on a resolution calibration test, adjusting image size based on a size calibration test, adjusting image location based on a location calibration test.

13. The method of claim 8, the displaying the image sequence further comprising displaying the image sequence with varying time intervals between images.

14. A method for providing a data communication device for communicating information via an image, said method comprising:
    providing an electronic device, comprising:
        a display screen;
        a display component configured to display an image sequence or authentication graphic on the display screen;
        a camera configured to read the image sequence or an authentication graphic;
        a decoding component configured to decode the read image sequence;
    a receiving component configured to receive the authentication graphic from the camera, wherein the electronic device is configured to perform an alignment detection algorithm using the camera, the display, and the image sequence graphic or the authentication graphic.

15. The method of claim 14, further comprising providing a second electronic device, the second device comprising components to at least one of:
    display an image sequence on a display screen of the second device and recognize a return authentication graphic by a camera; and
    read an image sequence by a camera of the second device and display an authentication graphic on a display screen.

16. The method of claim 15, wherein the second device further comprises:
    a display screen;
    a display component configured to display an image sequence or authentication graphic on the display screen of the second device;
    a camera configured to read an image sequence or an authentication graphic;
    a decoding component configured to decode the read image sequence; and
    a receiving component configured to receive the authentication graphic from the camera,
wherein the second device is configured to perform an alignment detection algorithm to locate a camera viewing the screen of the second device.

17. The method of claim 14, wherein the image sequence and authentication graphic each comprises at least one of: a barcode, a quick response (QR) code, and a graphical image.

18. The method of claim 14, wherein the device further comprises an image generating component configured to generate the displayed image sequence from the information, wherein the information is divided into packets, each packet being encoded as an image, and each packet including redundancy information or error correction data.

19. The method of claim 14, wherein the device further comprises at least one of: a display resolution component configured to adjust image resolution based on a resolution calibration test, a display size component configured to adjust image size based on a size calibration test, and a display location component configured to adjust image location based on a location calibration test.

20. The method of claim 14, wherein the display component is further configured to display the image sequence with varying time intervals between images.

* * * * *